(12) United States Patent
Grigorian

(10) Patent No.: US 8,346,065 B2
(45) Date of Patent: *Jan. 1, 2013

(54) APPARATUS AND METHOD OF STORING VIDEO DATA

(75) Inventor: Samuel Nikolay Grigorian, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/982,063

(22) Filed: Oct. 31, 2007

(65) Prior Publication Data

US 2008/0063359 A1    Mar. 13, 2008

Related U.S. Application Data

(63) Continuation of application No. 10/988,229, filed on Nov. 12, 2004, now Pat. No. 7,302,159.

(51) Int. Cl.
*H04N 5/92*    (2006.01)
*H04N 5/917*    (2006.01)

(52) U.S. Cl. .................................. 386/326; 386/329

(58) Field of Classification Search .................. 386/226, 386/229, 326, 328, 329, 332
See application file for complete search history.

(56) References Cited

U.S. PATENT DOCUMENTS

| | | | |
|---|---|---|---|
| 5,282,049 A | | 1/1994 | Hatakenaka et al. |
| 5,377,051 A | * | 12/1994 | Lane et al. ..................... 386/314 |
| 6,057,832 A | | 5/2000 | Lev et al. |
| 2002/0012521 A1 | | 1/2002 | Nagasaka et al. |
| 2002/0158878 A1 | | 10/2002 | Smirnov |
| 2006/0083488 A1 | | 4/2006 | Van Gassel et al. |
| 2007/0204320 A1 | | 8/2007 | Wu |

FOREIGN PATENT DOCUMENTS

| | | |
|---|---|---|
| JP | 2003-101943 A | 4/2003 |
| JP | 2004-015164 | 1/2004 |
| WO | 2004051998 A1 | 6/2004 |

* cited by examiner

*Primary Examiner* — Robert Chevalier
(74) *Attorney, Agent, or Firm* — Gilman Clark Hunter & Messina LLC

(57) ABSTRACT

An apparatus for and method of storing video data comprising receiving an MPEG video stream comprising I-frames and P-frames, separating the I-frames from the P-frames, storing the I-frames and the P-frames separately, and providing information so that the I-frames and the P-frames can be combined to produce a full-motion video.

7 Claims, 2 Drawing Sheets

APPARATUS AND METHOD OF STORING VIDEO DATA

CROSS-REFERENCE TO RELATED APPLICATIONS

This application is a continuation of application Ser. No. 10/988,229, filed Nov. 12, 2004, now U.S. Pat. No. 7,302,159 which is incorporated herein by reference.

STATEMENT REGARDING FEDERALLY SPONSORED RESEARCH OR DEVELOPMENT

N/A

BACKGROUND OF THE INVENTION

This invention relates to surveillance systems and, in particular, to an apparatus for and method of storing video data in a video surveillance system.

Archiving the video data gathered by video surveillance systems has been a challenge because of the large amount of data involved. In many instances this data may be stored for months or even years. With MPEG compression algorithms and the increased capacity of today's disk drives, the problem has been reduced, but it is far from being solved. In multichannel applications, the storage problem is compounded by the number of channels.

Current digital video recorders have two types of storage, namely, short-term and long-term. In most applications the short-term recordings are done with the maximum field rate to get full-motion video. All short-term available information is stored in a relatively small circular buffer. All video is stored at full-frame rate for the required period of time and then removed from the short-term buffer and put into another file for long-term storage. The file is either archived as originally recorded, which requires a large amount of long-term storage resources, or the file is processed to reduce the amount of data that is stored in archive. Processing the file before long-term storage requires that the file be reloaded and pruned in some way to provide a smaller file for archiving. This reloading and pruning process requires significant system resources and can seriously hamper the performance of the digital video recorder in recording current real time data and performing other real time operations.

SUMMARY OF THE INVENTION

In accordance with the present invention there is provided a method of storing video data comprising the steps of receiving an MPEG video stream comprising I-frames and P-frames, separating the I-frames from the P-frames, storing the I-frames and P-frames separately, and providing information so that the I-frames and P-frames can be combined to produce a full-motion video.

In accordance with the present invention there is also provided an apparatus for storing video data comprising an input for receiving an MPEG video stream comprising I-frames and P-frames, a video stream separator for separating the I-frames from the P-frames, memory for storing the I-frames and P-frames separately, and a sequence identifier for providing a unique identifier to the I-frames and P-frames so that the I-frames and P-frames can be combined to produce a full-motion video image.

In another aspect of the present invention there is provided a method of searching stored video data comprising the steps of receiving an MPEG video stream comprising I-frames and P-frames, separating the I-frames and P-frames, storing the I-frames and P-frames separately, and searching only the stored I-frames.

Another aspect of the present invention comprises an apparatus for searching stored video data comprising an input for receiving an MPEG video stream comprising I-frames and P-frames, a video stream separator for separating the I-frames and P-frames, memory for storing the I-frames and the P-frames separately, and a processor for searching only the stored I-frames.

In still another aspect of the present invention there is provided a method of providing a fast playback video comprising the steps of: receiving an MPEG video stream comprising I-frames and P-frames, separating the I-frames and P-frames; storing the I-frames and P-frames separately; and playing back only the stored I-frames in the fast playback mode.

In addition, in accordance with the present invention there is provided an apparatus for providing a fast playback video comprising an input for receiving an MPEG video stream comprising I-frames and P-frames; a video stream separator for separating the I-frames and P-frames; memory for storing the I-frames and P-frames separately; and a processor for playing back only the stored I-frames during fast playback mode.

Applicant's invention provides efficient preprocessing of the video data so that archiving of the video data is accomplished efficiently. Applicant's system provides full-motion video for the required time period and then allows easy archiving of the I-frame file by merely changing the file name, if desired, and placing it in archival storage. No reprocessing and interruption of the normal processing of the digital video recorder is required. By saving only the I-frames. The present invention eliminates up to eighty percent of the data to provide a significant savings advantage on long-term storage. Applicant's system can also utilize two circular buffers having different periods of time before data is overwritten with new data, thereby providing the possibility of full-motion video during the shorter period of time that the P-frame data is held and providing for the longer term storage of the second circular buffer containing the I-frames.

Applicant's invention also provides an efficient method to search video data and provide fast playback without burdening system resources.

Other advantages and applications of the present invention will be made apparent by the following detailed description of the preferred embodiment of the invention.

DETAILED DESCRIPTION OF THE INVENTION

Figure 1:
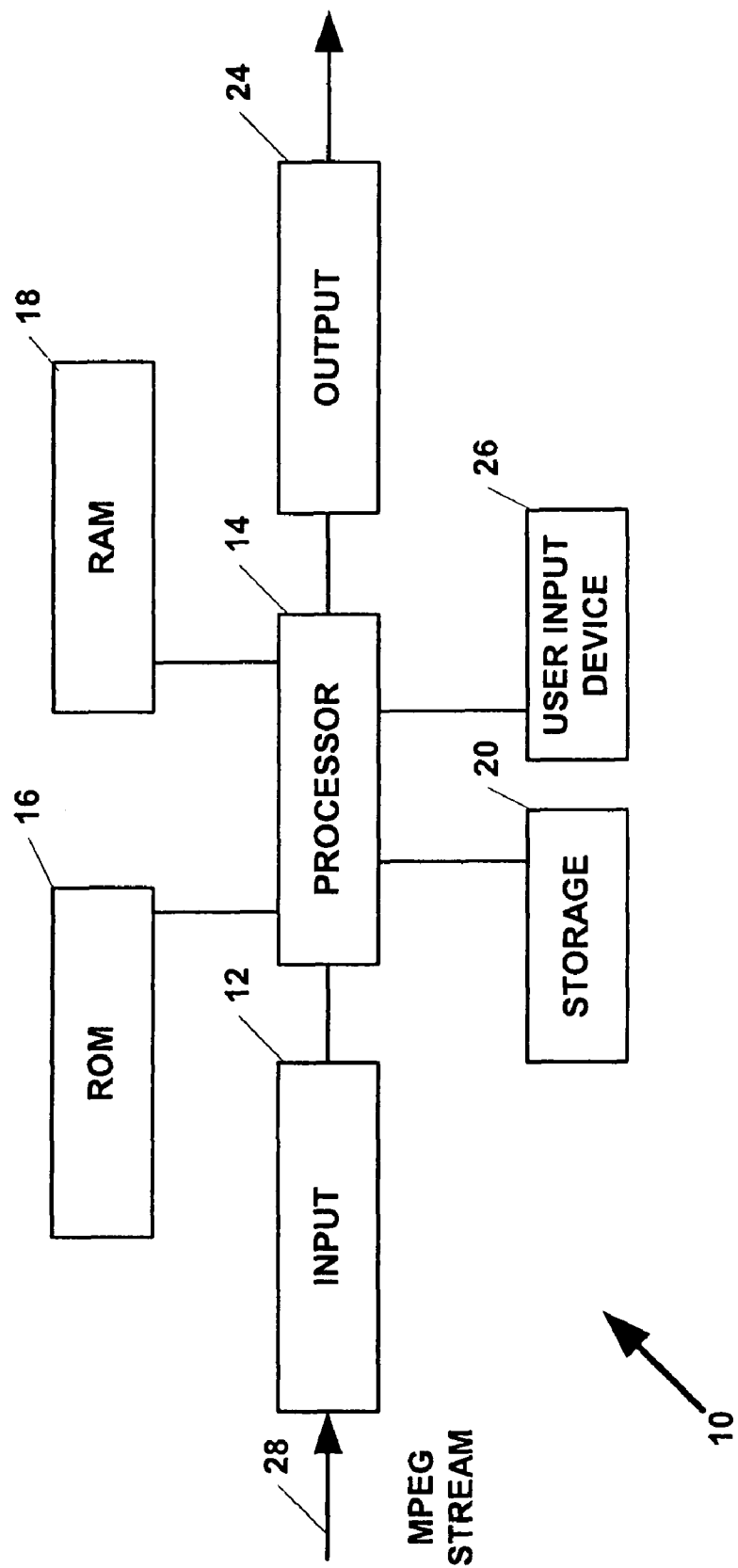
FIG. 1 is a block diagram of a digital video recorder utilizing the present invention.

Referring to FIG. 1, a digital video recorder 10 receives an MPEG video stream 28 at input 12, which provides MPEG video stream 28 to processor 14. MPEG video stream 28 can be provided via a closed network, local area network or wide area network, such as the Internet. Processor 14 is connected to ROM 16, RAM 18, and storage 20, which can be, for example, a disk drive or optical drive. Processor 14 provides output signals to output 24 for display on a monitor (not shown). Processor 14 implements algorithms and programs that are stored in ROM 16 or storage 20. User input device 26 can be a controller, keyboard, or other suitable input device connected directly to digital video recorder 10, or user input device 26 can be connected via a, network, which can be a closed network, local area network or wide area network, such as the Internet. User input device 26 provides user input to processor 14, such as instructions to begin or stop recording video data, play video data, search video data, playback video data in fast playback mode, and so forth.

Figure 2:
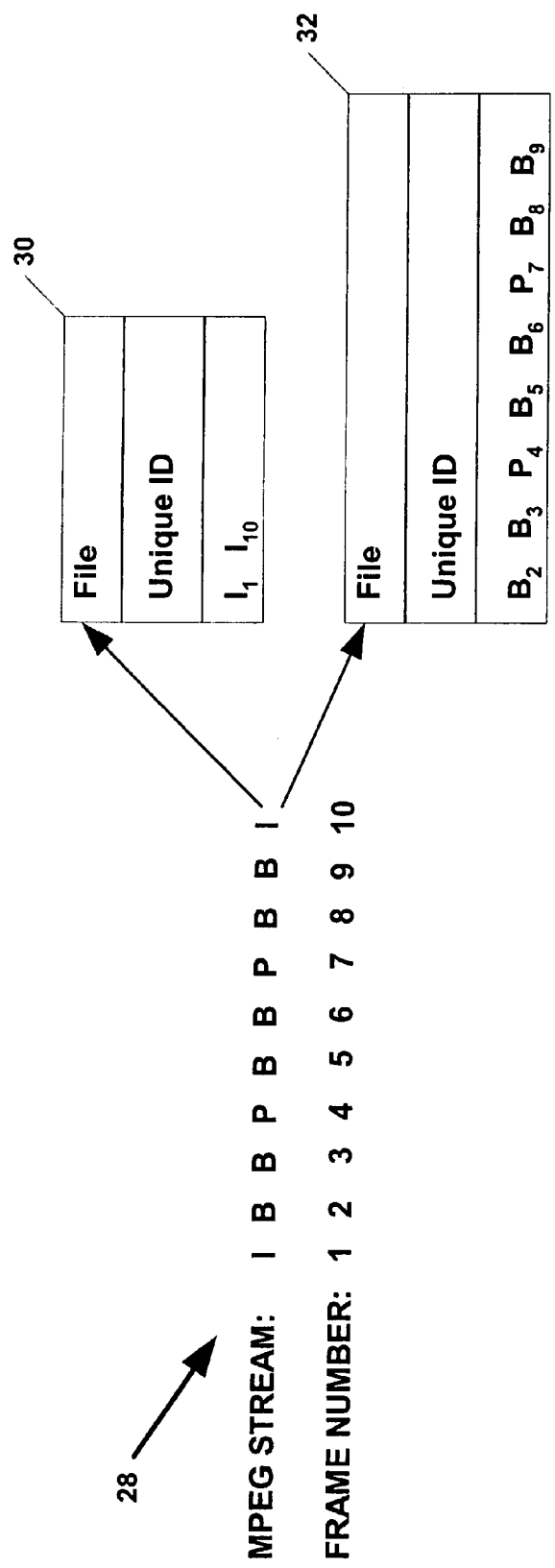
FIG. 2 is a diagrammatic block diagram illustrating the processing of an MPEG stream according to the present invention.

FIG. 2 illustrates an exemplary MPEG stream 28 that consists of a series of data frames encoding pictures. The three types of data frames are I-frames, P-frames, and B-frames. I-frames are encoded as a single image with no reference to any past or future frames. P-frames (predictive) are encoded relative to the past reference frame, which can be a P-frame or I-frame. The past reference frame is the closest preceding reference frame. B-frames (bidirectional predictive) are encoded relative to the past reference frame, the future reference frame, or both frames. The future reference frame is the closest following reference frame, either I-frame or P-frame. The series of frames, which is referred to in the art as a Group of Pictures (GOP), can take many different configurations, and, as stated above, MPEG video stream 28 is merely exemplary. The ratio of I-frames, P-frames, and B-frames is determined by the nature of the video stream and the bandwidth constraints of the network and system. In addition, the time required for encoding the video stream may also affect the ratio. MPEG video stream 28 is shown as having B-frames, although an MPEG stream consisting of only I-frames and P-frames has been found to be satisfactory for video surveillance system purposes.

With reference to FIG. 1 and FIG. 2, MPEG stream 28 is separated by processor 14 into two separate files, file 30 and file 32. Alternatively, other circuitry could be used as a video stream separator. Processor 14 determines the frame type by examining the frame headers. File 30 contains only I-frames, and file 32 contains P-frames and B-frames. As discussed above, MPEG stream 28 may not contain B-frames, and thus file 32 would contain only P-frames. Files 30 and 32 each have a unique identifier, which can be in the header of the respective files and can be a unique time stamp provided by processor 14. Processor 14 also provides each frame with a sequential frame number, (indicated as 1 through 10 in FIG. 2) so that files 30 and 32 can be combined by processor 14 to provide full-motion video in response to a request from user input device 26.

Files 30 and 32 can be stored in storage 20, which can be partitioned into short-term and long-term storage areas. The short-term and long-term storage areas can be circular buffers. The size of the two circular buffers depends on the amount of data to be stored and the length of time to keep the data before it is overwritten with new data. Alternatively, file 30 can be placed in long-term storage for archival purposes or held in an interim storage area prior to placing in long-term storage. File 32 is temporarily saved so that full-motion video can be provided by output 24 to a display for viewing for the required period of time to meet the purposes and policies of the surveillance system in which digital video recorder 10 is utilized. Processor 14 determines when the specified time has elapsed, whether it be hours, days, or longer, and then allows file 32 to be overwritten with new data. If file 32 is stored in a circular buffer, file 32 is stored there and then overwritten automatically without processor 14 monitoring the elapsed time. Similarly, file 30 can be placed in a circular and overwritten automatically. The time period between the storing of the data in the circular buffers until it is overwritten is greater for file 30 than it is for file 32. Short-term storage may be, for example, one to two weeks, and long-term storage may be, for example, six months. If desired, file 32 can be placed into long-term storage to provide full-motion video capability. File 32 can then be easily disposed of by overwriting it with other data or simply deleting if without affecting the I-frames which may be kept for archival purposes.

Digital video recorder 10 provides a savings of up to eighty percent of the space required for archival storage by storing only file 30 with the I-frames. Nevertheless, digital video recorder 10 still provides full-motion video capability during the period of time that such video may be of interest to the user. In addition, digital video recorder 10 does not require processor 14 to reload and process MPEG stream 28 before the data is archived as is required by a system that stores MPEG stream 28 as it is received by input 12.

If desired, prior to archival storage, file 30 can be processed by processor 14 so that only a portion of file 30 is placed into archival storage in storage 20. For example, a first I-frame may be stored, then one or more I-frames can be skipped and then the next I-frame is recorded. This process is repeated until all of file 30 has been processed. Processing file 30 to remove a portion of the I-frames is a relatively simple and efficient operation compared to reloading and reprocessing of the entire MPEG stream, thereby placing only a minimal demand on system resources.

If processor 14 receives a request to search the recorded video data, processor 14 executes the search using only file 30 to expedite the search and limit system resource requirements compared to a system that stores MPEG stream 28 as it is received by input 12. Similarly, if processor 14 receives a request to playback the recorded video data in fast playback mode, processor 14 provides the fast playback mode by playing only file 30. This provides a significant savings in the system resources required to display the recorded video data in fast playback mode compared to a system that stores MPEG stream 28 as it is received by input 12.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of storing video data comprising the steps of:
   receiving an MPEG video stream comprising a series of I-frames and P-frames;
   separating the I-frames from the P-frames;
   storing the I-frames from the P-frames in the MPEG video stream separately;
   providing information so that the I-frames and the P-frames can be combined to produce a full-motion video;
   setting a period of time to keep the P-frames;
   determining if the period of time has elapsed; and
   allowing the stored P-frames to be overwritten if the period of time has elapsed.

2. A method as recited in claim 1, wherein said providing step comprises providing an index to correlate the I-frames and the P-frames.

3. A method as recited in claim 1, wherein said providing step comprises giving each frame of the MPEG video stream received in said receiving step a unique identifier.

4. A method as recited in claim 1, wherein said providing step comprises giving each frame of the MPEG video stream received in said receiving step a unique time stamp and numbering the frames sequentially.

5. An apparatus for storing video data comprising:
- an input for receiving an MPEG video stream comprising I-frames and P-frames;
- a video stream separator for separating said I-frames from said P-frames;
- memory for storing said I-frames and said P-frames separately;
- a sequence identifier for providing a unique identifier to said I-frames and P-frames so that said I-frames and said P-frames can be combined to produce a full-motion video image; and
- a timer for allowing the setting of a period of time to keep the P-frames, for determining if the period of time has elapsed, and for allowing the stored P-frames to be overwritten if the period of time has elapsed.

6. An apparatus as recited in claim 5, wherein said sequencer provides an index to correlate said I-frames and said P-frames.

7. An apparatus as recited in claim 5, wherein said sequence identifier provides a unique time stamp and numbers the frames of said MPEG video stream sequentially.

* * * * *